United States Patent
Seo et al.

(10) Patent No.: US 12,160,032 B2
(45) Date of Patent: Dec. 3, 2024

(54) ELECTRONIC DEVICE COMPRISING ANTENNA MODULE

(71) Applicant: Samsung Electronics Co., Ltd., Suwon-si (KR)

(72) Inventors: Mincheol Seo, Suwon-si (KR); Nari Kim, Suwon-si (KR); Junwhon Uhm, Suwon-si (KR); Jaehyuk Lee, Suwon-si (KR); Sungchul Park, Suwon-si (KR); Jiyoon Park, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 314 days.

(21) Appl. No.: 17/548,015

(22) Filed: Dec. 10, 2021

(65) Prior Publication Data

US 2022/0102845 A1    Mar. 31, 2022

Related U.S. Application Data

(63) Continuation of application No. PCT/KR2020/007734, filed on Jun. 15, 2020.

(30) Foreign Application Priority Data

Jun. 14, 2019  (KR) ........................ 10-2019-0070404

(51) Int. Cl.
*H01Q 1/27*    (2006.01)
*H01Q 1/02*    (2006.01)
(Continued)

(52) U.S. Cl.
CPC .............. *H01Q 1/273* (2013.01); *H01Q 1/02* (2013.01); *H01Q 9/0407* (2013.01); *H01Q 9/16* (2013.01)

(58) Field of Classification Search
CPC ........ H01Q 1/273; H01Q 1/02; H01Q 9/0407; H01Q 9/16
See application file for complete search history.

(56) References Cited

U.S. PATENT DOCUMENTS 6,084,552 A    7/2000  Robertson et al.
9,337,526 B2   5/2016  Hong et al.
(Continued)

FOREIGN PATENT DOCUMENTS

JP    2008-310572 A    12/2008
KR    10-1999-0082324 A    11/1999
(Continued)

OTHER PUBLICATIONS

European Ssearch Report dated Jun. 20, 2022, issued in European Application No. 20822146.5.
(Continued)

*Primary Examiner* — Dieu Hien T Duong
(74) *Attorney, Agent, or Firm* — Jefferson IP Law, LLP

(57) ABSTRACT

An electronic device is provided. The electronic device includes a housing on which at least a part of an external device operating communication in a frequency band of 20 GHz or higher is mounted, support members comprising a first support member connected to an area of the housing so as to support wearing of the electronic device in an area of the user's head while surrounding at least a part of the horizontal circumference of the user's head, and a second member surrounding at least a part of the vertical circumference of the user's head, and an antenna module disposed in an area of the second support member. The antenna module comprises an antenna layer comprising multiple patch antenna elements, a wireless circuit layer laminated on
(Continued)

the lower portion of the antenna layer, and a heat-radiating layer laminated on the lower portion of the wireless circuit layer.

20 Claims, 11 Drawing Sheets

(51) Int. Cl.
*H01Q 9/04* (2006.01)
*H01Q 9/16* (2006.01)

(56) References Cited

U.S. PATENT DOCUMENTS

| | | |
|---|---|---|
| 9,733,480 B2 | 8/2017 | Baek et al. |
| 9,923,261 B2 | 3/2018 | Jin et al. |
| 10,146,302 B2 | 12/2018 | Tokubo |
| 10,209,771 B2 | 2/2019 | Tokubo |
| 10,774,987 B2 | 9/2020 | Xu et al. |
| 11,038,279 B2 | 6/2021 | Kim et al. |
| 2016/0062125 A1 | 3/2016 | Baek et al. |
| 2017/0229769 A1 | 8/2017 | Yokoyama et al. |
| 2018/0259778 A1 | 9/2018 | Pu et al. |
| 2018/0323508 A1 | 11/2018 | Chigusa et al. |
| 2019/0113967 A1 | 4/2019 | Tokubo |
| 2019/0173167 A1* | 6/2019 | Ariumi ............... H01Q 3/24 |
| 2019/0173195 A1 | 6/2019 | Kim et al. |
| 2019/0214709 A1 | 7/2019 | Frishman et al. |
| 2020/0006849 A1* | 1/2020 | Zhu ................ H01Q 21/22 |
| 2020/0400274 A1 | 12/2020 | Xu et al. |
| 2021/0351503 A1* | 11/2021 | Miyagawa ........... H01Q 23/00 |

FOREIGN PATENT DOCUMENTS

| | | |
|---|---|---|
| KR | 10-2005-0084836 A | 8/2005 |
| KR | 10-2015-0145219 A | 12/2015 |
| KR | 10-2016-0112154 A | 9/2016 |
| KR | 10-1780024 B1 | 9/2017 |
| KR | 10-2230076 B1 | 3/2021 |
| WO | 2018/035209 A1 | 2/2018 |
| WO | 2018/152910 A1 | 8/2018 |

OTHER PUBLICATIONS

Korean Office Action dated Aug. 1, 2023, issued in a Korean Patent Application No. 10-2019-0070404.

* cited by examiner

ELECTRONIC DEVICE COMPRISING ANTENNA MODULE

CROSS-REFERENCE TO RELATED APPLICATION(S)

This application is a continuation application, claiming priority under § 365(c), of an International application No. PCT/KR2020/007734, filed on Jun. 15, 2020, which is based on and claims the benefit of a Korean patent application number 10-2019-0070404, filed on Jun. 14, 2019, in the Korean Intellectual Property Office, the disclosure of which is incorporated by reference herein in its entirety.

BACKGROUND

1. Field

The disclosure relates to an electronic device including an antenna module. More particularly, the disclosure relates to an electronic device capable of supporting the seamless operation of 5th generation (5G) mobile communication of the external device by including an antenna module for covering a shaded region of a mounted external device.

2. Description of Related Art

A wireless communication protocol has been proposed to more efficiently transmit and receive information resources, which are involved in the operation of an electronic device (e.g., a smartphone), to and from an external device. For example, in recent years, the application of a next-generation mobile communication technology using a signal of an ultra-high frequency, so-called 5th generation (5G) mobile communication technology, has been considered for electronic devices. The 5G mobile communication technology refers to the wireless communication protocol defined by the 3rd generation partnership project (3GPP), and enables high-speed or large-capacity data transmission and reception by using a signal in a millimeter (mm) Wave band.

The electronic device may include an antenna module supporting the operation of the 5G mobile communication. For example, with regard to the improvement of communication efficiency by suppressing the interference of radio waves, the antenna module may be disposed in a specified region in the electronic device. As such, the way to dispose the antenna module on the electronic device may be excluded. In this case, there may be a shaded region being a region at which a beam formed by the antenna module does not arrive.

The above information is presented as background information only to assist with an understanding of the disclosure. No determination has been made, and no assertion is made, as to whether any of the above might be applicable as prior art with regard to the disclosure.

SUMMARY

An electronic device (hereinafter referred to as an "external device") that operates the 5G mobile communication may be mounted in a head mounted display (HMD) device (hereinafter referred to as an "electronic device") put on an eye region of the user and may provide augmented reality or virtual reality services. In this regard, in an antenna module of an external device that transmits and receives service data to or from an access point (or a content server), a direction that the antenna module faces may change irregularly depending on the body movement of the user wearing the electronic device. Accordingly, when the directionality between the antenna module and the access point does not correspond, for example, when the shaded region on the external device faces the access point, the service data transmission and reception efficiency of the external device may be reduced, thereby restricting service provision through the electronic device.

Aspects of the disclosure are to address at least the above-mentioned problems and/or disadvantages and to provide at least the advantages described below. Accordingly, an aspect of the disclosure is to provide an electronic device capable of supporting the seamless operation of 5G mobile communication of the external device by including an antenna module for covering a shaded region of a mounted external device.

Additional aspects will be set forth in part in the description which follows and, in part, will be apparent from the description, or may be learned by practice of the presented embodiments.

In accordance with an aspect of the disclosure, an electronic device is provided. The electronic device includes a housing in which at least a portion of an external device performing communication in a frequency band of 20 GHz or more is mounted, a support member that is connected with one region of the housing to allow a user to wear the electronic device on one region of a head of the user and includes a first support member surrounding at least a portion of a horizontal circumference of the user's head and a second support member surrounding at least a portion of a vertical circumference of the user's head, and an antenna module that is disposed in one region of the second support member.

According to an embodiment of the disclosure, the antenna module may include an antenna layer including a plurality of patch antenna elements, a wireless circuit layer stacked under the antenna layer, and a heat radiating layer stacked under the wireless circuit layer.

In accordance with another aspect of the disclosure, an electronic device is provided. The electronic device includes a housing in which at least a portion of an external device performing communication in a frequency band of 20 GHz or more is mounted, a support member that is connected with one region of the housing to allow a user to wear the electronic device on one region of a head of the user and includes a first support member surrounding at least a portion of a horizontal circumference of the user's head and a second support member surrounding at least a portion of a vertical circumference of the user's head, an antenna module that is disposed in one region of the second support member, and a processor that is electrically connected with the antenna module.

According to an embodiment of the disclosure, the antenna module may include a wireless circuit layer, a first dipole antenna element group disposed to face a first direction, a second dipole antenna element group disposed to face a second direction, a third dipole antenna element group disposed to face a third direction, and a plurality of switches that selectively connect the wireless circuit layer with the first dipole antenna element group, the second dipole antenna element group, and the third dipole antenna element group.

According to an embodiment of the disclosure, the processor may measure a quality of a signal that the first dipole antenna element group, the second dipole antenna element group, and the third dipole antenna element group receive, may compare the measured signal quality and a specified threshold value, and may control at least one switch, which corresponds to at least one dipole antenna element group receiving a signal having the signal quality of the specified threshold value or more, from among the plurality of switches such that the wireless circuit layer is electrically connected with the at least one dipole antenna element group receiving the signal having the signal quality of the specified threshold value or more.

According to various embodiments of the disclosure, the antenna module included in an electronic device may compensate for the shaded region of an external device mounted in the electronic device, and thus, the seamless operation of 5G mobile communication of the external device and the seamless service operation through the electronic device may be supported.

Besides, a variety of effects directly or indirectly understood through the specification may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
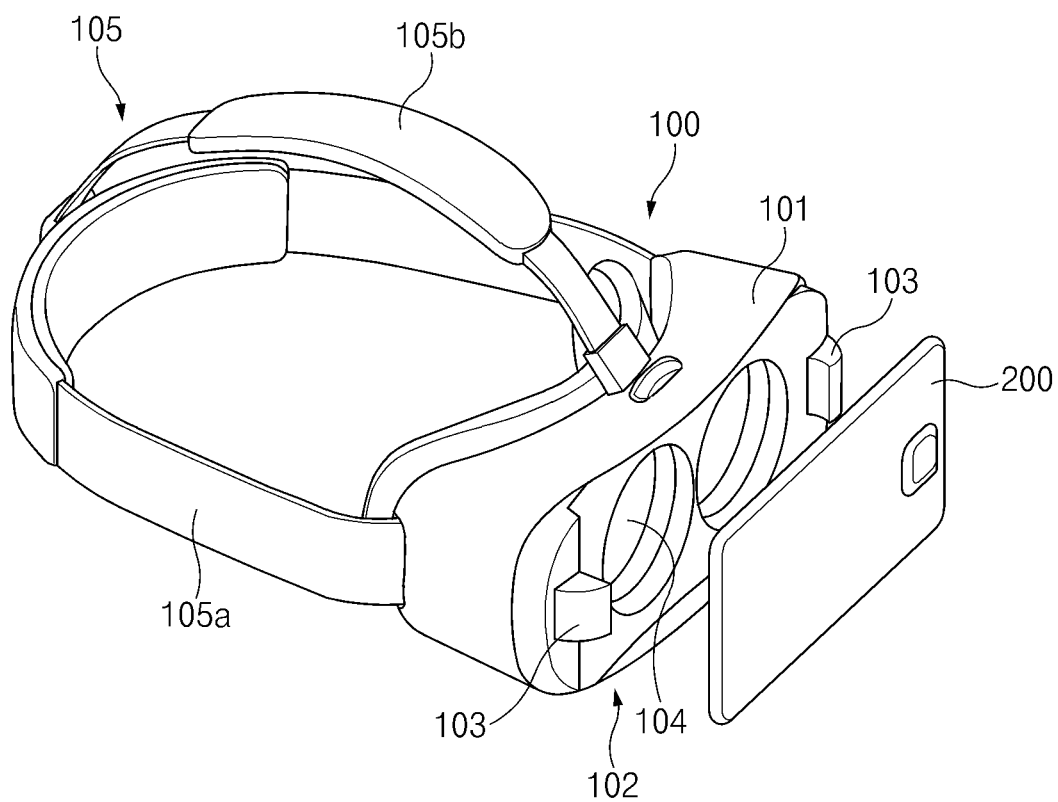
FIG. 1 is a view illustrating an operation of an electronic device according to an embodiment of the disclosure.
Figure 2:
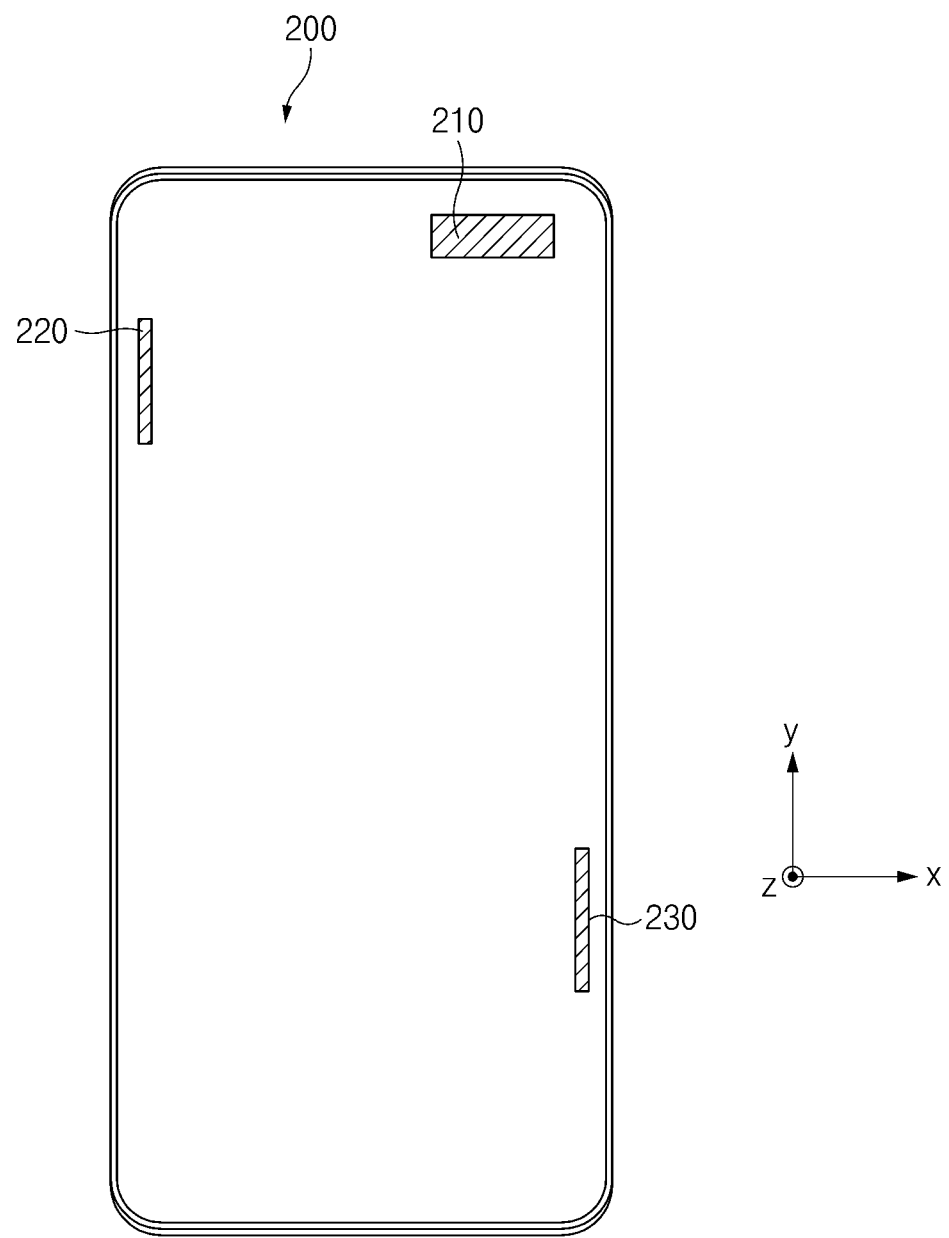
FIG. 2 is a view illustrating an interior of an external device according to an embodiment of the disclosure.
Figure 3:
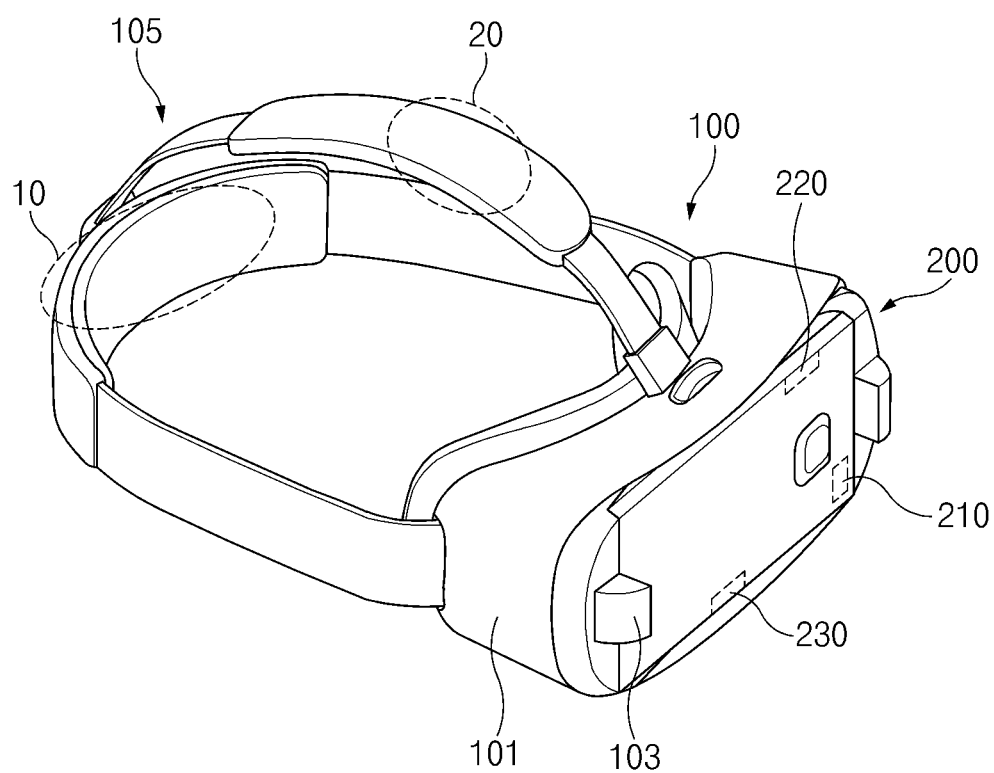
FIG. 3 is a view illustrating an arrangement location of an antenna module on an electronic device according to an embodiment of the disclosure.

FIG. 1 is a view illustrating an operation of an electronic device according to an embodiment of the disclosure. FIG. 2 is a view illustrating an interior of an external device according to an embodiment of the disclosure. FIG. 3 is a view illustrating an arrangement location of an antenna module on an electronic device according to an embodiment of the disclosure.

Referring to FIG. 1, an electronic device 100 (e.g., a head mounted display device) according to an embodiment may be operated to interact with an external device 200 (e.g., a smartphone). In this regard, the electronic device 100 may be removably fastened to at least part of the external device 200 such that the external device 200 is mounted therein. Alternatively, the electronic device 100 may be physically integrated with the external device 200 such that the external device 200 is included therein. The electronic device 100 may provide a virtual reality or an augmented reality service by displaying, on the visibility of the user, content output through a display of the external device 200.

In an embodiment of the disclosure, the electronic device 100 may include a housing 101 and a support member 105.

The housing 101 may form at least part of the body of the electronic device 100 and may internally include at least one resource (e.g., a communication circuit 120, a memory 130, and/or a processor 150 to be described with reference to FIG. 6) associated with performing functions of the electronic device 100. Alternatively, the housing 101 may include a front frame region 102, at least part of which is exposed to the outside to provide a space, structure, or cavity in which the external device 200 is mounted (or installed). In an embodiment of the disclosure, at least one fastening member 103 for supporting the connection of the external device 200 to the electronic device 100 may be included in one region of the front frame region 102. According to various embodiments of the disclosure, the at least one fastening member 103 may function as a fastening means between the electronic device 100 and the external device 200 and may also function as an interface for transferring data between the electronic device 100 and the external device 200. For example, a connector that is connected with a port (e.g., a USB port) provided in the external device 200 to transfer data to the external device 200 or to receive data from the external device 200 may be included in one region of at least one fastening member 103. In an embodiment of the disclosure, a lens assembly 104 that displays content on the visibility of the user may be further included in the housing 101, and at least part of the lens assembly 104 may be exposed to the outside through the front frame region 102 so as to face the display of the external device 200 mounted. In various embodiments of the disclosure, an input interface (e.g., a touch pad, a physical key, a joystick, and/or a wheel) that supports the reception of a user input associated with a function control (e.g., an audio volume control and/or a lens distance control) of the electronic device 100 may be included in one region of the housing 101.

The support member 105 may allow the user to wear the electronic device 100. For example, the support member 105 may be connected with one region of the housing 101 such that the housing 101 is fixed on the user's face when wearing the electronic device 100. In an embodiment of the disclosure, the support member 105 may include a first support member 105*a* that surrounds at least a portion of a horizontal circumference of the user's head when wearing the electronic device 100 and a second support member 105*b* that surrounds at least a portion of a vertical circumference of the user's head when wearing the electronic device 100, and the first support member 105*a* and the second support member 105*b* may be at least partially formed of a ring shape to correspond to a head shape of the user. In various embodiments of the disclosure, at least part of the support member 105 may include an elastic material or a cushion material for the purpose of allowing the user to easily wear the electronic device 100. In addition, the support member 105 may include a velcro, a buckle, or a magnet for adjusting a length.

Referring to FIG. 2, the external device 200 mounted in the electronic device 100 of FIG. 1 may include at least one antenna module that supports the operation of 5G mobile communication (e.g., the operation of communication using a frequency band of 20 GHz or more) therein. For example, the external device 200 may include at least one of a first antenna module 210 disposed at an upper right end of a back surface of the external device 200, a second antenna module 220 disposed at an upper left end thereof, and a third antenna module 230 disposed at a lower right end thereof, when viewed in the Z-axis direction in a state where a back plate of the external device 200 is removed.

The first antenna module 210 may include a plurality of patch-type antenna elements that are disposed to face the back surface of the external device 200. The first antenna module 210 may generate a beam of a radiation pattern facing a first external direction (e.g., a +Z-axis direction) from the interior of the external device 200 by using the plurality of patch-type antenna elements. Alternatively, the first antenna module 210 may include a plurality of dipole antenna elements. The first antenna module 210 may generate beams of radiation patterns facing a second external direction (e.g., a +Y-axis direction) and a display direction (e.g., a direction between a +Y-axis and a −Z-axis on an YZ-plane) of the external device 200 from the interior of the external device 200 by using the plurality of dipole antenna elements.

The second antenna module 220 may include a plurality of patch-type antenna elements disposed to face a left side surface of the external device 200 with respect to the back surface of the external device 200. The second antenna module 220 may generate a beam of a radiation pattern facing a third external direction (e.g., a −X-axis direction) from the interior of the external device 200 by using the plurality of patch-type antenna elements. As in the above description, the third antenna module 230 may include a plurality of patch-type antenna elements disposed to face a right side surface of the external device 200 with respect to the back surface of the external device 200. The third antenna module 230 may generate a beam of a radiation pattern facing a fourth external direction (e.g., a +X-axis direction) from the interior of the external device 200 by using the plurality of patch-type antenna elements.

Referring to FIG. 3, when the external device 200 is mounted in the electronic device 100, the operation of 5G mobile communication of the external device 200 may be at least partially restricted. In this regard, at least one antenna module 210, 220, and/or 230 included in the external device 200 may be disposed in a specific region of the external device 200 (e.g., at the upper right end, the upper left end, and/or the lower right end with respect to the back surface of the external device 200), and the external device 200 may include a region in which the placement of the at least one antenna module 210, 220, and/or 230 is excluded. Alternatively, when the external device 200 is mounted in the electronic device 100, at least one antenna module 210, 220, and/or 230 included in the external device 200 may be shielded by a structure (e.g., at least part of the housing 101 forming the front frame region 102 of FIG. 1) of the electronic device 100 and may be affected by signal interference. As such, in an operating environment in which the external device 200 is mounted in the electronic device 100, a shaded region that does not belong to a beam coverage of the at least one antenna module 210, 220, and/or 230 included in the external device 200 may be present in the electronic device 100. For example, a first shaded region 10 at which a beam radiated from the at least one antenna module 210, 220, and/or 230 of the external device 200 does not arrive may be present in one region (e.g., a region corresponding to the back of the user's head) of the first support member 105*a* (refer to FIG. 1) surrounding at least a portion of the horizontal circumference of the user's head, when wearing the electronic device 100. For another example, a second shaded region 20 at which a beam radiated from the at least one antenna module 210, 220, and/or 230 of the external device 200 does not arrive may be present in one region (e.g., a region corresponding to the top of the user's head) of the second support member 105*b* (refer to FIG. 1) surrounding at least a portion of the vertical circumference of the user's head, when wearing the electronic device 100. The first shaded region 10 or the second shaded region 20 are only an example, and a shaded region that is present in the electronic device 100 may be variable depending on a structure in which the at least one antenna module 210, 220, and/or 230 is disposed in the external device 200 or a structure in which the external device 200 is mounted (or installed) in the electronic device 100.

Considering the above description, the external device 200 mounted in the electronic device 100 may have difficulty in stably transmitting or receiving a signal in a direction corresponding to the first shaded region 10 or the second shaded region 20 or may have low signal transmission or reception sensitivity. In this regard, the electronic device 100 according to an embodiment may include one antenna module (e.g., an antenna module 110*a* or 110*b* to be described with reference to FIGS. 4A to 5B) for transmitting or receiving a signal of the external device 200 by compensating for a shaded region (e.g., the first shaded region 10 and/or the second shaded region 20) of the external device 200. For example, the one antenna module 110*a* or 110*b* may be disposed in a region of the second support member 105*b*, which corresponds to the second shaded region 20 present in the second support member 105b or is adjacent to the second shaded region 20.

According to an embodiment of the disclosure, the one antenna module 110a or 110b may transfer a signal in a millimeter wave band received from the outside (e.g., an access point or a base station) to the external device 200 mounted in the electronic device 100, and the external device 200 may output an image or a video included in the transferred signal on a screen. Alternatively, the one antenna module 110a or 110b may convert a signal transferred from the external device 200 mounted in the electronic device 100 into a signal in a millimeter wave band and may transmit the signal in the millimeter wave band to the outside. In this regard, the electronic device 100 may include a conductive member (not illustrated) for electrically connecting the one antenna module 110a or 110b and the external device 200. In an embodiment of the disclosure, at least a portion of the conductive member may be disposed in the interior of the support member 105 and the interior of the housing 101. For example, one end of the conductive member may be electrically connected with the one antenna module 110a or 110b within the second support member 105b, and an opposite end thereof may be electrically connected with the connector included in the at least one fastening member 103. As such, the one antenna module 110a or 110b and the external device 200 may be electrically connected. According to various embodiments of the disclosure, the conductive member may include at least one of a coaxial cable and a flexible printed circuit board.

In an embodiment of the disclosure, the one antenna module 110a or 110b disposed in the second support member 105b may form a beam coverage in relatively multiple directions compared to the case where the one antenna module 110a or 110b is disposed in one region (e.g., a region corresponding to the first shaded region 10 or adjacent to the first shaded region 10) of the first support member 105a.

Figure 4A:
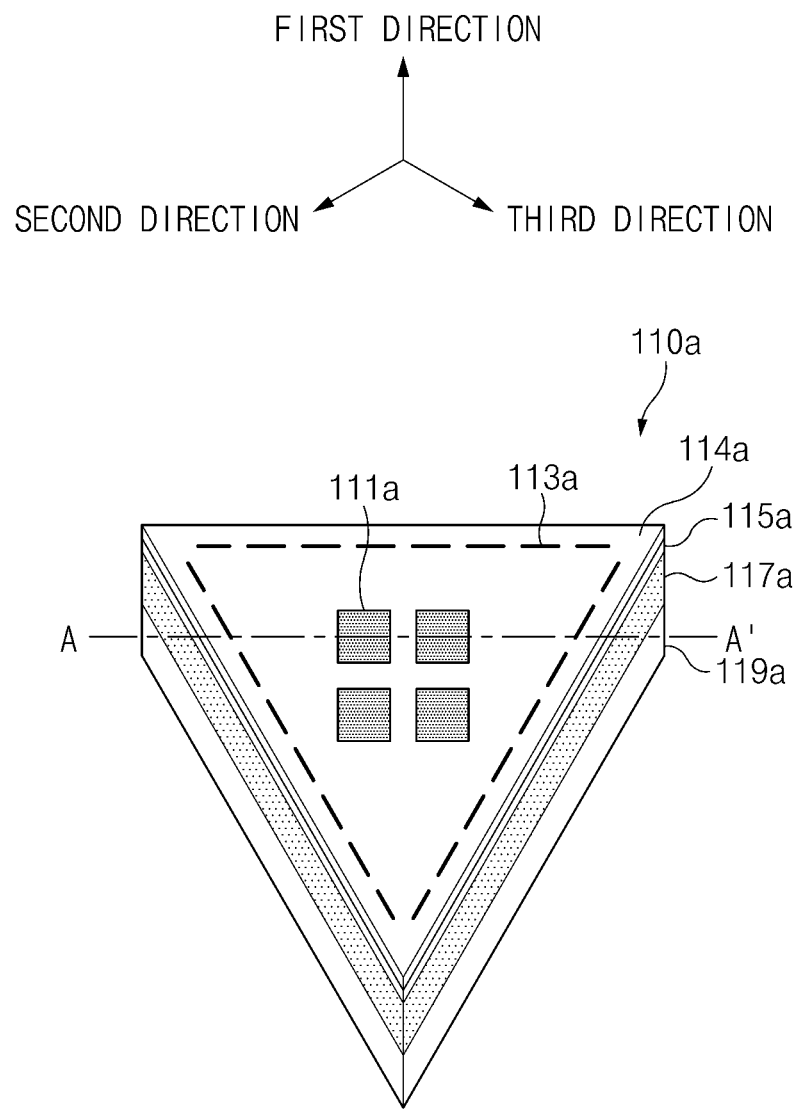
FIG. 4A is a view illustrating an antenna module of an electronic device according to an embodiment of the disclosure.
Figure 4B:
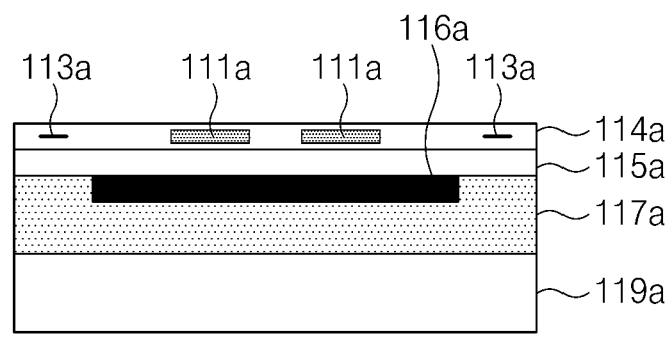
FIG. 4B is a view illustrating a cross section of an antenna module taken along one direction, according to an embodiment of the disclosure.

FIG. 4A is a view illustrating an antenna module of an electronic device according to an embodiment of the disclosure. FIG. 4B is a view illustrating a cross section of an antenna module taken along one direction, according to an embodiment of the disclosure. In FIG. 4B, one direction of the antenna module may be understood as direction A-A' of FIG. 4A.

Referring to FIGS. 4A and 4B, the antenna module 110a disposed in the second support member 105b (refer to FIG. 1) of the electronic device 100 (refer to FIG. 1 or 3) may include an antenna layer 114a, a wireless circuit layer 115a, a heat radiating layer 117a, and an absorption layer 119a. In an embodiment of the disclosure, the antenna layer 114a, the wireless circuit layer 115a, the heat radiating layer 117a, and the absorption layer 119a may be the same or similar to each other in shape and area (e.g., may be formed in the shape of a triangle or a regular triangle) and may be stacked in a specified order; edge regions thereof may be aligned side by side when stacked.

The antenna layer 114a may include at least one dielectric layer, and may include a plurality of antenna elements disposed within the at least one dielectric layer. For example, the antenna layer 114a may include, in an inner central region, a plurality of patch antenna elements 111a forming a beam coverage in a direction perpendicular to the antenna module 110a, and may include, in an inner edge (or peripheral) region, a plurality of dipole antenna elements 113a forming a beam coverage in a direction parallel to the antenna module 110a. According to an embodiment of the disclosure, the plurality of dipole antenna elements 113a may be disposed to be grouped depending on a heading direction. For example, the plurality of dipole antenna elements 113a may include a first dipole antenna element group disposed along a first edge region of the antenna layer 114a so as to cover a first direction, a second dipole antenna element group disposed along a second edge region of the antenna layer 114a so as to cover a second direction, and a third dipole antenna element group disposed along a third edge region of the antenna layer 114a so as to cover a third direction. In an embodiment of the disclosure, the number of dipole antenna elements in the first dipole antenna element group, the number of dipole antenna elements in the second dipole antenna element group, and the number of dipole antenna elements in the third dipole antenna element group may be equal or similar to each other.

The wireless circuit layer 115a may be disposed under the antenna layer 114a, and may process a signal in a millimeter wave band that is transmitted or received through at least one of the plurality of patch antenna elements 111a and the plurality of dipole antenna elements 113a that the antenna layer 114a includes. In this regard, the wireless circuit layer 115a may include a transmit terminal (Tx) for transmitting a signal through at least one of the plurality of patch antenna elements 111a and the plurality of dipole antenna elements 113a, and a receive terminal (Rx) for receiving a signal through at least one of the plurality of patch antenna elements 111a and the plurality of dipole antenna elements 113a. In addition, the wireless circuit layer 115a may include a first switch group for selectively connecting at least some of the plurality of patch antenna elements 111a with the transmit terminal or the receive terminal, and a second switch group for selectively connecting at least some of the plurality of dipole antenna elements 113a with the transmit terminal or the receive terminal. In an embodiment of the disclosure, a signal that is received from the outside (e.g., an access point or a base station) through at least one of the plurality of patch antenna elements 111a and the plurality of dipole antenna elements 113a may be transferred to the receive terminal of the wireless circuit layer 115a, and a signal that is provided from the external device 200 (refer to FIG. 1, 2, or 3) mounted in the electronic device 100 may be transferred to the transmit terminal of the wireless circuit layer 115a so as to be transmitted to the outside through at least one of the plurality of patch antenna elements 111a and the plurality of dipole antenna elements 113a.

According to an embodiment of the disclosure, a radio frequency integrated circuit (RFIC) 116a may be mounted in one region of the wireless circuit layer 115a. The RFIC 116a may change, for example, a frequency band of a transmit or receive signal when the antenna module 110a transmits or receives a signal. For example, in the case of transmitting a signal, the RFIC 116a may convert a baseband signal or an intermediate frequency (IF) signal transferred from the external device 200 into an RF signal in a frequency band available in a 5G network. Alternatively, in the case of receiving a signal, the RFIC 116a may convert the RF signal in the frequency band available in the 5G network into the baseband signal or the IF signal so as to be processed by a processor that the external device 200 includes.

In various embodiments of the disclosure, the wireless circuit layer 115a may transfer an IF signal to the external device 200 or may receive an IF signal from the external device 200. In this regard, the external device 200 may include an intermediate frequency integrated circuit (IFIC) capable of converting an IF signal into a baseband signal or converting the baseband signal into an IF signal. In an embodiment of the disclosure, the IFIC may be electrically or operatively connected with a communication processor included in the external device 200 and may transmit or receive a baseband signal.

According to various embodiments of the disclosure, an IFIC connected with the RFIC 116a may be included in one region of the wireless circuit layer 115a. The wireless circuit layer 115a may transfer a baseband signal to the external device 200 or may receive a baseband signal from the external device 200. In this regard, the external device 200 may include a communication processor that transmits and receives the baseband signal.

According to various embodiments of the disclosure, a communication processor that is electrically or operatively connected with the IFIC may be included in one region of the wireless circuit layer 115a. The wireless circuit layer 115a may transfer a demodulated signal to the external device 200 or may receive a demodulated signal from the external device 200. The external device 200 may include an application processor capable of transmitting and receiving the signal, and the application processor may output an image or a video included in the received signal on the screen of the external device 200.

The heat radiating layer 117a may be disposed under the wireless circuit layer 115a and may radiate heat generated from at least one of the antenna layer 114a and the wireless circuit layer 115a. In this regard, at least a portion of the heat radiating layer 117a according to an embodiment may include at least one of copper (Cu), aluminum (Al), silicon carbide (SiC), and aluminum nitride (AlN), which have excellent thermal conductivity.

The absorption layer 119a may block electromagnetic waves from the antenna module 110a to prevent the electromagnetic waves from being absorbed into the body of the user wearing the electronic device 100. In an embodiment of the disclosure, at least a portion of the absorption layer 119a may include at least one of iron (Fe), cobalt (Co), and nickel (Ni), which are ferromagnetic substances.

Figure 5A:
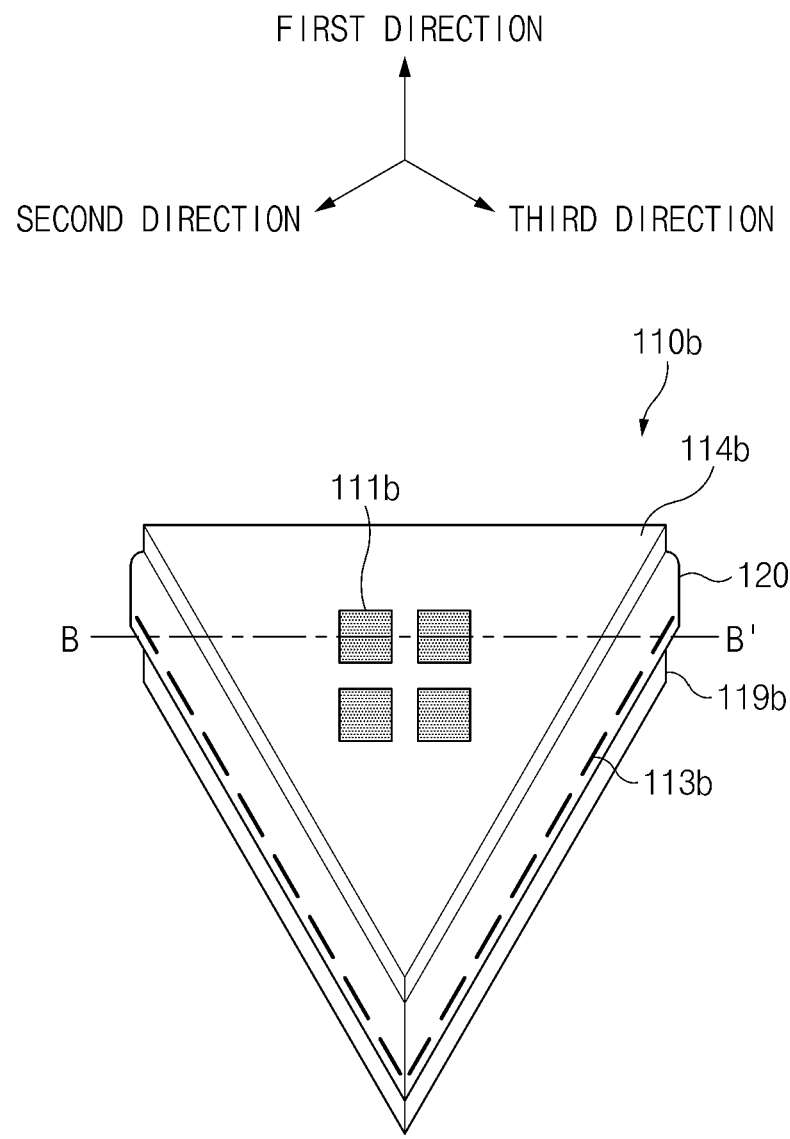
FIG. 5A is a view illustrating an antenna module of an electronic device according to an embodiment of the disclosure.
Figure 5B:
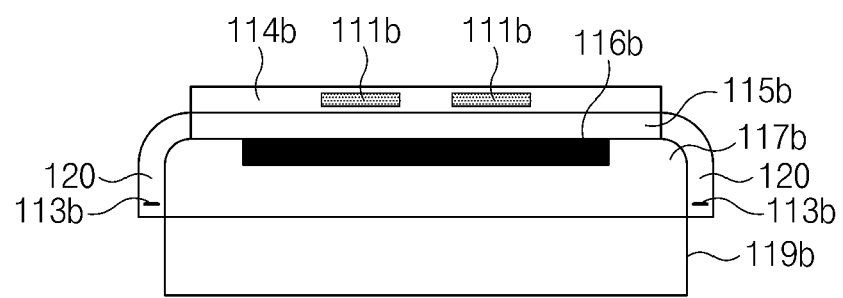
FIG. 5B is a view illustrating a cross section of an antenna module taken along one direction, according to an embodiment of the disclosure.

FIG. 5A is a view illustrating an antenna module of an electronic device according to an embodiment of the disclosure. FIG. 5B is a view illustrating a cross section of an antenna module taken along one direction according to an embodiment of the disclosure. In FIG. 5B, one direction of the antenna module may be understood as direction B-B' of FIG. 5A. In FIGS. 5A and 5B, components that correspond to the components of the antenna module 110a (refer to FIG. 4A or 4B) described with reference to FIGS. 4A and 4B may be marked by like reference numerals, and thus, additional description will be omitted to avoid redundancy.

Referring to FIGS. 5A and 5B, the antenna module 110b disposed in the second support member 105b (refer to FIG. 1) of the electronic device 100 (refer to FIG. 1 or 3) may include an antenna layer 114b, a wireless circuit layer 115b, a heat radiating layer 117b, an absorption layer 119b, and a printed circuit board 120 (e.g., a flexible printed circuit board (FPCB)). In an embodiment of the disclosure, the antenna layer 114b, the wireless circuit layer 115b, the heat radiating layer 117b, and the absorption layer 119b may be the same or similar to each other in shape and area (e.g., may be formed in the shape of a triangle or a regular triangle), and some thereof may have the same, similar, or different areas. For example, the antenna layer 114b and the wireless circuit layer 115b may be formed to have the same or similar areas, that is, the first area such that edge regions thereof are aligned side by side when stacked, and the heat radiating layer 117b and the absorption layer 119b may be formed to have the second area larger than the first area such that edge regions thereof are aligned side by side when stacked. When a stacked structure of the antenna layer 114b and the wireless circuit layer 115b and a stacked structure of the heat radiating layer 117b and the absorption layer 119b are stacked, the stacked structure of the heat radiating layer 117b and the absorption layer 119b may relatively protrude from the stacked structure of the antenna layer 114b and the wireless circuit layer 115b.

The antenna layer 114b may include at least one dielectric layer, and a plurality of patch antenna elements 111b that form a beam coverage in a direction perpendicular to the antenna module 110b may be included in an inner central region of the at least one dielectric layer.

The wireless circuit layer 115b may be disposed under the antenna layer 114b, and may process a signal in a millimeter wave band that is transmitted or received through at least one of the plurality of patch antenna elements 111b that the antenna layer 114b includes. Alternatively, the wireless circuit layer 115b may process a signal in a millimeter wave band that is transmitted or received through at least one of a plurality of dipole antenna elements 113b included in the printed circuit board 120, which will be described later. In an embodiment of the disclosure, an RFIC 116b that changes a frequency band of a signal to be transmitted through the antenna module 110b or a signal received through the antenna module 110b may be mounted in one region of the wireless circuit layer 115b.

In the heat radiating layer 117b disposed under the wireless circuit layer 115b, an upper edge of an edge region may be curved with a specified curvature; the printed circuit board 120 of a specified thickness (e.g., about 3 mm) may be curved to correspond to a shape of the edge region of the heat radiating layer 117b such that one end of the printed circuit board 120 is electrically and physically connected with the wireless circuit layer 115b and one surface of the printed circuit board 120 physically surrounds the edge region of the heat radiating layer 117b.

According to an embodiment of the disclosure, the printed circuit board 120 may include the plurality of dipole antenna elements 113b, which form a beam coverage in a direction parallel to the antenna module 110b, in an inner partial region. According to an embodiment of the disclosure, the plurality of dipole antenna elements 113b may include a first dipole antenna element group disposed to cover the first direction, a second dipole antenna element group disposed to cover the second direction, a third dipole antenna element group disposed to cover the third direction, in the printed circuit board 120.

According to various embodiments of the disclosure, the antenna layer 114b, the wireless circuit layer 115b, the heat radiating layer 117b, and the absorption layer 119b may be the same or similar to each other in shape and area. For example, edge regions of the antenna layer 114b, the wireless circuit layer 115b, the heat radiating layer 117b, and the absorption layer 119b may be aligned side by side when stacked. In this case, the printed circuit board 120 including the plurality of dipole antenna elements 113b may be disposed to physically surround the edge regions of the wireless circuit layer 115b and the heat radiating layer 117b, and may protrude from an alignment surface of the antenna layer 114b, the wireless circuit layer 115b, the heat radiating layer 117b, and the absorption layer 119b as much as a specified thickness (e.g., 3 mm)

Figure 6:
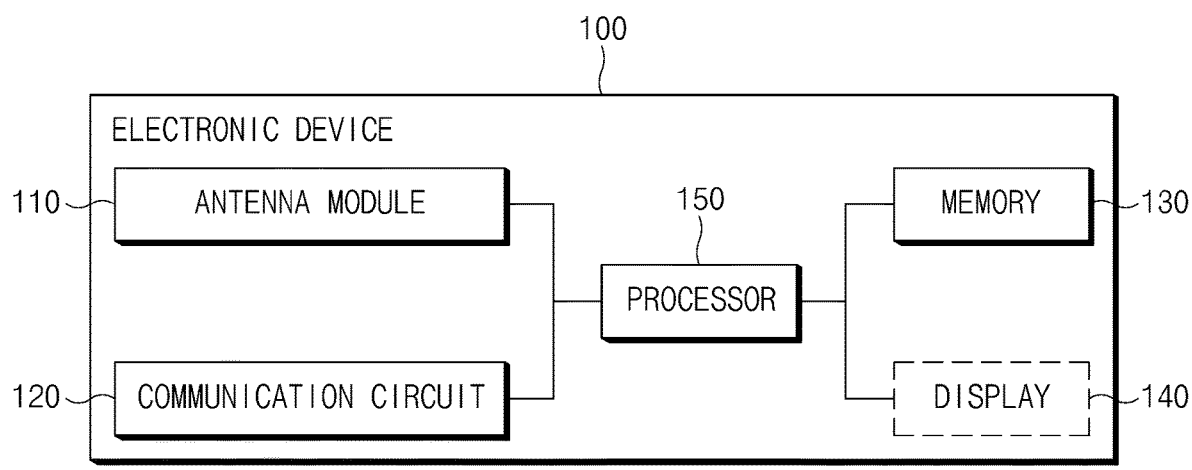
FIG. 6 is a view illustrating a configuration of an electronic device according to an embodiment of the disclosure.
Figure 7:
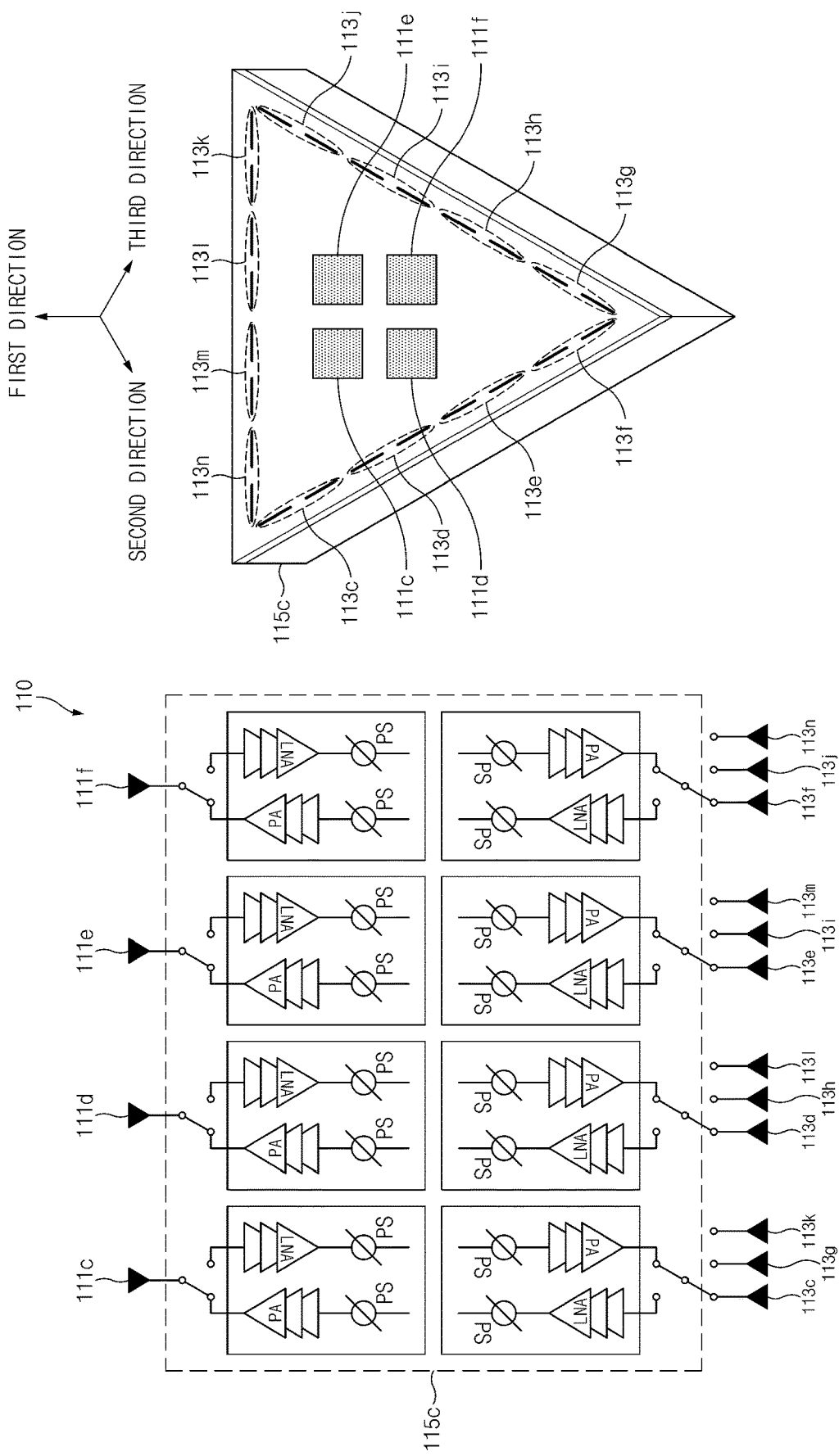
FIG. 7 is a view illustrating a switching structure in an antenna module according to an embodiment of the disclosure.

FIG. 6 is a view illustrating a configuration of an electronic device according to an embodiment of the disclosure. FIG. 7 is a view illustrating a switching structure in an antenna module according to an embodiment of the disclosure.

Referring to FIGS. 6 and 7, the electronic device 100 according to an embodiment may further include the communication circuit 120, the memory 130, a display 140, and the processor 150, which support the operation of the antenna module 110 or the operation of content services of the electronic device 100, in addition to the antenna module 110 (e.g., the antenna module 110*a* of FIG. 4A or 4B or the antenna module 110*b* of FIG. 5A or 5B) described above. In various embodiments of the disclosure, the electronic device 100 may not include at least one of the above-described components or may further include any other component. For example, in the case where the external device 200 of FIG. 1, 2, or 3 is not integrated with the electronic device 100 but is mounted in the electronic device 100, the electronic device 100 may not include the display 140. Alternatively, the electronic device 100 may further include at least some of components of an electronic device 801 to be described with reference to FIG. 8 or 9.

The communication circuit 120 may support communication between the electronic device 100 and at least one external device (e.g., the external device 200, an access point, or a base station). For example, the communication circuit 120 may establish wired communication or wireless communication with the at least one external device in compliance with the defined protocol and may transmit/receive data or a signal through the wired communication or wireless communication. In an embodiment of the disclosure, the communication circuit 120 may include the wireless circuit layer 115*a* of FIG. 4A or 4B or the wireless circuit layer 115*b* of FIG. 5B, which the antenna module 110 includes.

The memory 130 may store at least one signal or data associated with the operation of the electronic device 100 or may store at least one instruction associated with functional operations of the components of the electronic device 100. For example, the memory 130 may store data associated with virtual reality content or augmented reality content to be output through the display 140 or the display of the external device 200 mounted.

The display 140 may output various kinds of content corresponding to image information. For example, under control of the processor 150, the display 140 may display the virtual reality content or augmented reality content on the visibility of the user through the lens assembly 104 (refer to FIG. 1) of the electronic device 100 by outputting the virtual reality content or augmented reality content.

The processor 150 may be implemented with at least one of a central processing unit, an application processor, and a communication processor and may control the components of the electronic device 100 described above. For example, the processor 150 may be electrically or operatively connected with the components of the electronic device 100 so as to transfer at least one command associated with a functional operation to the components or to perform various arithmetic operations or data processing.

In an embodiment of the disclosure, the processor 150 may control at least part of a second switch group included in a wireless circuit layer 115*c* of the antenna module 110 for the purpose of selectively operate at least some of a plurality of patch antenna elements 113*c*, 113*d*, 113*e*, 113*f*, 113*g*, 113*h*, 113*i*, 113*j*, 113*k*, 113*l*, 113*m*, and/or 113*n* that the antenna module 110 includes. For example, the processor 150 may control at least some switches of the second switch group for the purpose of selectively operating at least one dipole antenna element from 111*c*, 111*d*, 111*e*, and 111*f* in a first dipole antenna group 113*n*, 113*m*, 113*l*, and/or 113*k* disposed to face the first direction, selectively operating at least one dipole antenna element from 111*c*, 111*d*, 111*e*, and 111*f* in a second dipole antenna group 113*c*, 113*d*, 113*e*, and/or 113*f* disposed to face the second direction, or selectively operating at least one dipole antenna element from 111*c*, 111*d*, 111*e*, and 111*f* in a third dipole antenna group 113*g*, 113*h*, 113*i*, and/or 113*j* disposed to face the third direction. In this regard, in the case where the antenna module 110 receives a signal in a millimeter wave band from the outside, the processor 150 may measure signal qualities (e.g., a received signal strength indicator (RSSI), a reference signal received power (RSRP), a signal to noise ratio (SNR), or a signal-to-interference-plus-noise ratio (SINR)) of each of the plurality of patch antenna elements 113*c*, 113*d*, 113*e*, 113*f*, 113*g*, 113*h*, 113*i*, 113*j*, 113*k*, 113*l*, 113*m*, and/or 113*n* and may compare the measured signal qualities with a specified threshold value. The processor 150 may determine the operation of at least one patch antenna element from 111*c*, 111*d*, 111*e*, and 111*f* that receives a signal having a signal quality of the specified threshold value or more from among the measured signal qualities, and may control a switch corresponding to the determined at least one patch antenna element from 111*c*, 111*d*, 111*e*, and 111*f* so as to be electrically connected with the transmit terminal or the receive terminal included in the wireless circuit layer 115*c*.

According to one embodiment of various embodiments described above, an electronic device may include a housing in which at least a portion of an external device performing communication in a frequency band of 20 GHz or more is mounted, a support member that is connected with one region of the housing to allow a user to wear the electronic device on one region of a head of the user and includes a first support member surrounding at least a portion of a horizontal circumference of the user's head and a second support member surrounding at least a portion of a vertical circumference of the user's head, and an antenna module that is disposed in one region of the second support member. The antenna module may include an antenna layer including a plurality of patch antenna elements, a wireless circuit layer stacked under the antenna layer, and a heat radiating layer stacked under the wireless circuit layer.

According to various embodiments of the disclosure, the electronic device may include a head mounted display device.

According to various embodiments of the disclosure, the housing may include at least one fastening member supporting mounting of the external device, and the at least one fastening member may include a connector supporting a data transfer between the electronic device and the external device.

According to various embodiments of the disclosure, the electronic device may further include a conductive member that electrically connects the antenna module and the external device, and the conductive member may include one end electrically connected with the antenna module within the second support member, and an opposite end electrically connected with the connector of the at least one fastening member within the housing.

According to various embodiments of the disclosure, the antenna module may convert a signal in a first frequency band received from the outside into a signal in a second frequency band lower than the first frequency band so as to be transferred to the external device through the conductive member, and may convert a signal in the second frequency band received from the external device through the conductive member into a signal in the first frequency band so as to be transmitted to the outside.

According to various embodiments of the disclosure, the external device may include at least one antenna module, and the antenna module may be disposed in an inner partial region of the second support member, at which a beam coverage of the at least one antenna module of the external device does not arrive.

According to various embodiments of the disclosure, the electronic device may further include an absorption layer stacked under the heat radiating layer. The antenna layer, the wireless circuit layer, the heat radiating layer, and the absorption layer may include the same area and shape, and edge regions of the antenna layer, the wireless circuit layer, the heat radiating layer, and the absorption layer may be aligned side by side when stacked.

According to various embodiments of the disclosure, the antenna layer may further include a plurality of dipole antenna elements in an inner edge region of the antenna layer.

According to various embodiments of the disclosure, the plurality of dipole antenna elements may include at least one of a first dipole antenna element group disposed along a first edge region of the antenna layer so as to cover a first direction, a second dipole antenna element group disposed along a second edge region of the antenna layer so as to cover a second direction, and a third dipole antenna element group disposed along a third edge region of the antenna layer so as to cover a third direction.

According to various embodiments of the disclosure, each of the first dipole antenna element group, the second dipole antenna element group, and the third dipole antenna element group may include the same number of dipole antenna elements.

According to various embodiments of the disclosure, the wireless circuit layer may include a transmit terminal for transmitting a signal in a specified frequency band through the antenna module and a receive terminal for receiving a signal in the specified frequency band through the antenna module.

According to various embodiments of the disclosure, the wireless circuit layer may include a first switch group for selectively connecting at least some of the plurality of patch antenna element with the transmit terminal or the receive terminal, and a second switch group for selectively connecting at least some of the plurality of dipole antenna elements with the transmit terminal or the receive terminal According to various embodiments of the disclosure, at least a portion of the heat radiating layer may include at least one of copper (Cu), aluminum (Al), silicon carbide (SiC), and aluminum nitride (AlN).

According to various embodiments of the disclosure, at least a portion of the absorption layer may include at least one of iron (Fe), cobalt (Co) and nickel (Ni).

According to various embodiments of the disclosure, the electronic device may further include a flexible printed circuit board that includes a plurality of dipole antenna elements in an inner partial region and is disposed such that one end of the flexible printed circuit board is electrically and physically connected with the wireless circuit layer and one surface of the flexible printed circuit board physically surrounds at least a portion of an edge region of the heat radiating layer.

According to various embodiments of the disclosure, the edge region of the heat radiating layer may be curved with a specified curvature, and the printed circuit board may be curved to correspond to a shape of the edge region of the heat radiating layer.

According to various embodiments of the disclosure, the plurality of dipole antenna elements may include at least one of a first dipole antenna element group disposed to cover a first direction, a second dipole antenna element group disposed to cover a second direction, and a third dipole antenna element group disposed to cover a third direction, within the printed circuit board.

According to one embodiment of various embodiments described above, an electronic device may include a housing in which at least a portion of an external device performing communication in a frequency band of 20 GHz or more is mounted, a support member that is connected with one region of the housing to allow a user to wear the electronic device on one region of a head of the user and includes a first support member surrounding at least a portion of a horizontal circumference of the user's head and a second support member surrounding at least a portion of a vertical circumference of the user's head, an antenna module that is disposed in one region of the second support member, and a processor that is electrically connected with the antenna module. The antenna module may include a wireless circuit layer, a first dipole antenna element group disposed to face a first direction, a second dipole antenna element group disposed to face a second direction, a third dipole antenna element group disposed to face a third direction, and a plurality of switches that selectively connect the wireless circuit layer with the first dipole antenna element group, the second dipole antenna element group, and the third dipole antenna element group. The processor may measure a quality of a signal that the first dipole antenna element group, the second dipole antenna element group, and the third dipole antenna element group receive, may compare the measured signal quality and a specified threshold value, and may control at least one switch, which corresponds to at least one dipole antenna element group receiving a signal having the signal quality of the specified threshold value or more, from among the plurality of switches such that the wireless circuit layer is electrically connected with the at least one dipole antenna element group receiving the signal having the signal quality of the specified threshold value or more.

According to various embodiments of the disclosure, the antenna module may further include an antenna layer including a plurality of patch antenna elements in an inner central region and stacked over the wireless circuit layer, and the first dipole antenna element group, the second dipole antenna element group, and the third dipole antenna element group may be included in an inner edge region of the antenna layer.

According to various embodiments of the disclosure, the antenna module may further include an antenna layer that includes a plurality of patch antenna elements in an inner central region and is stacked over the wireless circuit layer, a heat radiating layer that is stacked under the wireless circuit layer and at least a portion of which includes at least one of copper (Cu), aluminum (Al), silicon carbide (SiC), and aluminum nitride (AlN), an absorption layer that is stacked under the heat radiating layer and at least a portion of which includes at least one of iron (Fe), cobalt (Co) and nickel (not illustrated), and a flexible printed circuit board that includes the first dipole antenna element group, the second dipole antenna element group, and the third dipole antenna element group in an inner partial region and is disposed such that one end of the flexible printed circuit board is electrically and physically connected with the wireless circuit layer and one surface of the flexible printed circuit board physically surrounds at least a portion of an edge region of the heat radiating layer.

Figure 8:
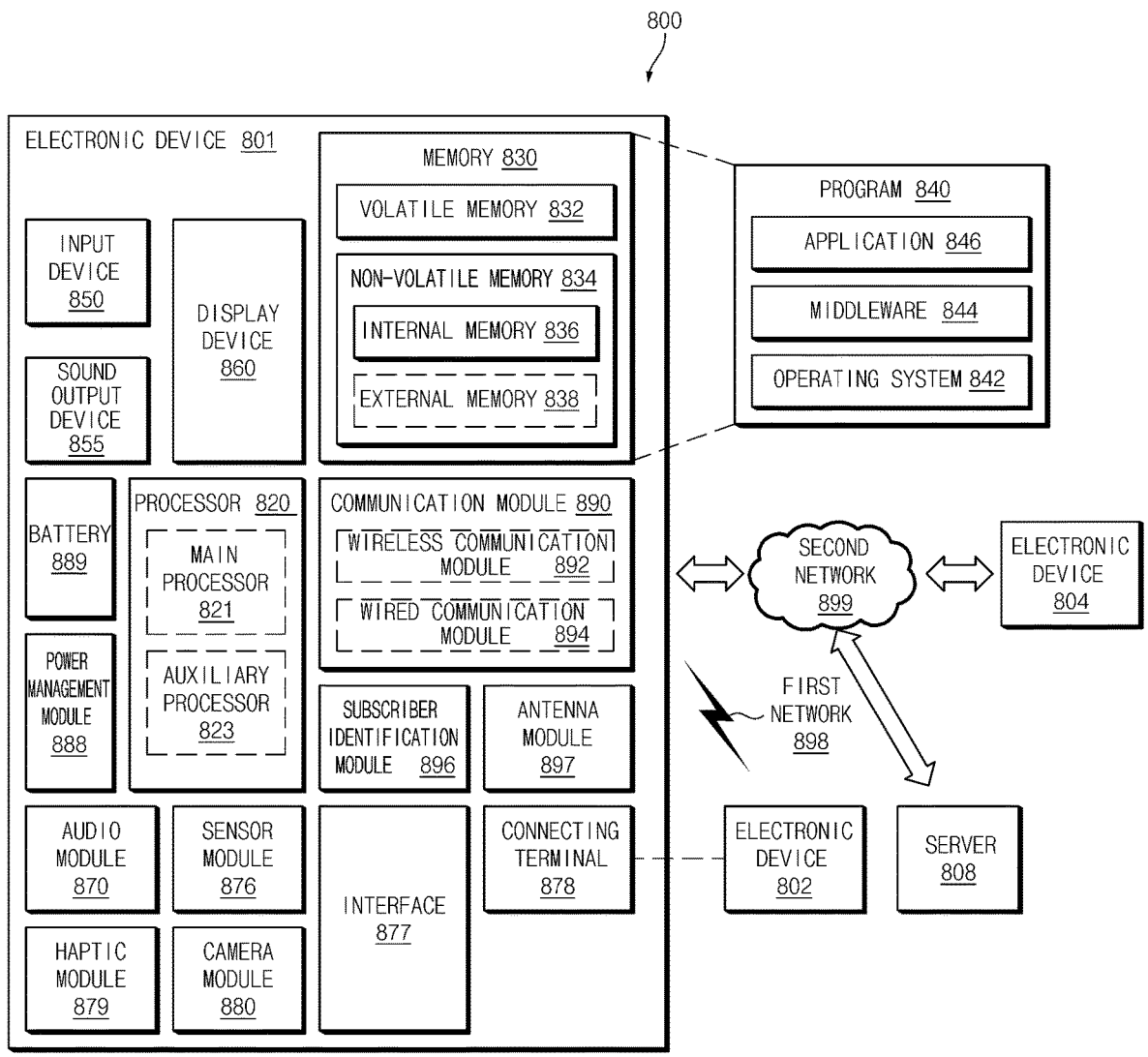
FIG. 8 is a diagram illustrating an electronic device in a network environment according to an embodiment of the disclosure.

FIG. 8 is a diagram of an electronic device in a network environment according to an embodiment of the disclosure.

Referring to FIG. 8, an electronic device 801 may communicate with an electronic device 802 through a first network 898 (e.g., a short-range wireless communication network) or may communicate with an electronic device 804 or a server 808 through a second network 899 (e.g., a long-distance wireless communication network) in a network environment 800. According to an embodiment of the disclosure, the electronic device 801 may communicate with the electronic device 804 through the server 808. According to an embodiment of the disclosure, the electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module 896, or an antenna module 897. According to some embodiments of the disclosure, at least one (e.g., the display device 860 or the camera module 880) among components of the electronic device 801 may be omitted or one or more other components may be added to the electronic device 801. According to some embodiments of the disclosure, some of the above components may be implemented with one integrated circuit. For example, the sensor module 876 (e.g., a fingerprint sensor, an iris sensor, or an illuminance sensor) may be embedded in the display device 860 (e.g., a display).

The processor 820 may execute, for example, software (e.g., a program 840) to control at least one of other components (e.g., a hardware or software component) of the electronic device 801 connected to the processor 820 and may process or compute a variety of data. According to an embodiment of the disclosure, as a part of data processing or operation, the processor 820 may load a command set or data, which is received from other components (e.g., the sensor module 876 or the communication module 890), into a volatile memory 832, may process the command or data loaded into the volatile memory 832, and may store result data into a nonvolatile memory 834. According to an embodiment of the disclosure, the processor 820 may include a main processor 821 (e.g., a central processing unit or an application processor) and an auxiliary processor 823 (e.g., a graphic processing device, an image signal processor, a sensor hub processor, or a communication processor), which operates independently from the main processor 821 or with the main processor 821. Additionally or alternatively, the auxiliary processor 823 may use less power than the main processor 821, or is specified to a designated function. The auxiliary processor 823 may be implemented separately from the main processor 821 or as a part thereof The auxiliary processor 823 may control, for example, at least some of functions or states associated with at least one component (e.g., the display device 860, the sensor module 876, or the communication module 890) among the components of the electronic device 801 instead of the main processor 821 while the main processor 821 is in an inactive (e.g., sleep) state or together with the main processor 821 while the main processor 821 is in an active (e.g., an application execution) state. According to an embodiment of the disclosure, the auxiliary processor 823 (e.g., the image signal processor or the communication processor) may be implemented as a part of another component (e.g., the camera module 880 or the communication module 890) that is functionally related to the auxiliary processor 823.

The memory 830 may store a variety of data used by at least one component (e.g., the processor 820 or the sensor module 876) of the electronic device 801. For example, data may include software (e.g., the program 840) and input data or output data with respect to commands associated with the software. The memory 830 may include the volatile memory 832 or the nonvolatile memory 834.

The program 840 may be stored in the memory 830 as software and may include, for example, an operating system 842, a middleware 844, or an application 846.

The input device 850 may receive a command or data, which is used for a component (e.g., the processor 820) of the electronic device 801, from an outside (e.g., a user) of the electronic device 801. The input device 850 may include, for example, a microphone, a mouse, a keyboard, or a digital pen (e.g., a stylus pen).

The sound output device 855 may output a sound signal to the outside of the electronic device 801. The sound output device 855 may include, for example, a speaker or a receiver. The speaker may be used for general purposes, such as multimedia play or recordings play, and the receiver may be used for receiving calls. According to an embodiment of the disclosure, the receiver and the speaker may be either integrally or separately implemented.

The display device 860 may visually provide information to the outside (e.g., the user) of the electronic device 801. For example, the display device 860 may include a display, a hologram device, or a projector and a control circuit for controlling a corresponding device. According to an embodiment of the disclosure, the display device 860 may include a touch circuitry configured to detect the touch or a sensor circuit (e.g., a pressure sensor) for measuring an intensity of pressure on the touch.

The audio module 870 may convert a sound and an electrical signal in dual directions. According to an embodiment of the disclosure, the audio module 870 may obtain the sound through the input device 850 or may output the sound through the sound output device 855 or an external electronic device (e.g., the electronic device 802 (e.g., a speaker or a headphone)) directly or wirelessly connected to the electronic device 801.

The sensor module 876 may generate an electrical signal or a data value corresponding to an operating state (e.g., power or temperature) inside or an environmental state (e.g., a user state) outside the electronic device 801. According to an embodiment of the disclosure, the sensor module 876 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 877 may support one or more designated protocols to allow the electronic device 801 to connect directly or wirelessly to the external electronic device (e.g., the electronic device 802). According to an embodiment of the disclosure, the interface 877 may include, for example, an HDMI (high-definition multimedia interface), a USB (universal serial bus) interface, an SD card interface, or an audio interface.

A connecting terminal 878 may include a connector that physically connects the electronic device 801 to the external electronic device (e.g., the electronic device 802). According to an embodiment of the disclosure, the connecting terminal 878 may include, for example, an HDMI connector, a USB connector, an SD card connector, or an audio connector (e.g., a headphone connector).

The haptic module 879 may convert an electrical signal to a mechanical stimulation (e.g., vibration or movement) or an electrical stimulation perceived by the user through tactile or kinesthetic sensations. According to an embodiment of the disclosure, the haptic module 879 may include, for example, a motor, a piezoelectric element, or an electric stimulator.

The camera module 880 may shoot a still image or a video image. According to an embodiment of the disclosure, the camera module 880 may include, for example, at least one or more lenses, image sensors, image signal processors, or flashes.

The power management module 888 may manage power supplied to the electronic device 801. According to an embodiment of the disclosure, the power management module 888 may be implemented as at least a part of a power management integrated circuit (PMIC).

The battery 889 may supply power to at least one component of the electronic device 801. According to an embodiment of the disclosure, the battery 889 may include, for example, a non-rechargeable (primary) battery, a rechargeable (secondary) battery, or a fuel cell.

The communication module 890 may establish a direct (e.g., wired) or wireless communication channel between the electronic device 801 and the external electronic device (e.g., the electronic device 802, the electronic device 804, or the server 808) and support communication execution through the established communication channel The communication module 890 may include at least one communication processor operating independently from the processor 820 (e.g., the application processor) and supporting the direct (e.g., wired) communication or the wireless communication. According to an embodiment of the disclosure, the communication module 890 may include a wireless communication module 892 (e.g., a cellular communication module, a short-range wireless communication module, or a GNSS (global navigation satellite system) communication module) or a wired communication module 894 (e.g., an LAN (local area network) communication module or a power line communication module). The corresponding communication module among the above communication modules may communicate with the external electronic device through the first network 898 (e.g., the short-range communication network, such as a Bluetooth, a WiFi direct, or an IrDA (infrared data association)) or the second network 899 (e.g., the long-distance wireless communication network, such as a cellular network, an internet, or a computer network (e.g., LAN or WAN)). The above-mentioned various communication modules may be implemented into one component (e.g., a single chip) or into separate components (e.g., chips), respectively. The wireless communication module 892 may identify and authenticate the electronic device 801 using user information (e.g., international mobile subscriber identity (IMSI)) stored in the subscriber identification module 896 in the communication network, such as the first network 898 or the second network 899.

The antenna module 897 may transmit or receive a signal or power to or from the outside (e.g., the external electronic device). According to an embodiment of the disclosure, the antenna module 897 may include an antenna including a radiating element including a conductive material or a conductive pattern formed in or on a substrate (e.g., PCB). According to an embodiment of the disclosure, the antenna module 897 may include a plurality of antennas. In such a case, at least one antenna appropriate for a communication scheme used in the communication network, such as the first network 898 or the second network 899, may be selected, for example, by the communication module 890 from the plurality of antennas. The signal or the power may then be transmitted or received between the communication module 890 and the external electronic device via the selected at least one antenna. According to an embodiment of the disclosure, another component (e.g., a radio frequency integrated circuit (RFIC)) other than the radiating element may be additionally formed as part of the antenna module 897.

At least some components among the components may be connected to peripheral devices through a communication method (e.g., a bus, a GPIO (general purpose input and output), an SPI (serial peripheral interface), or an MIPI (mobile industry processor interface)) to exchange signals (e.g., a command or data) with each other.

According to an embodiment of the disclosure, the command or data may be transmitted or received between the electronic device 801 and the external electronic device 804 through the server 808 connected to the second network 899. Each of the electronic devices 802 and 804 may be the same or different types as or from the electronic device 801. According to an embodiment of the disclosure, all or some of the operations performed by the electronic device 801 may be performed by one or more external electronic devices among the external electronic devices 802, 804, or 808. For example, when the electronic device 801 performs some functions or services automatically or by request from a user or another device, the electronic device 801 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 801. The electronic device 801 may provide the result as is or after additional processing as at least a part of the response to the request. To this end, for example, a cloud computing, distributed computing, or client-server computing technology may be used.

Figure 9:
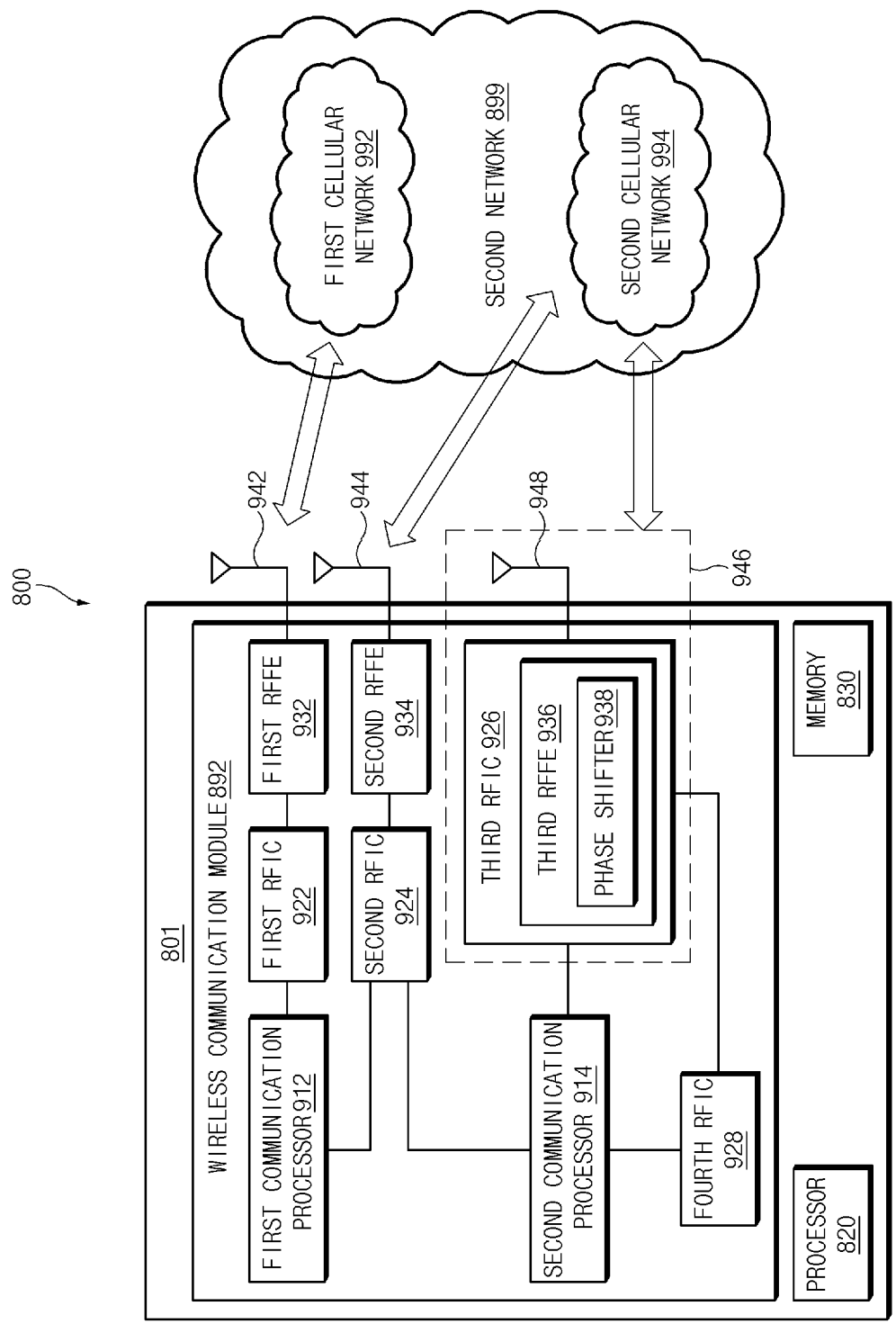
FIG. 9 is a diagram illustrating an electronic device for supporting legacy network communication and 5G network communication according to an embodiment of the disclosure.

FIG. 9 is a diagram of an electronic device for supporting legacy network communication and 5G network communication according to an embodiment of the disclosure.

Referring to FIG. 9, the electronic device 801 may include a first communication processor 912, a second communication processor 914, a first radio frequency integrated circuit (RFIC) 922, a second RFIC 924, a third RFIC 926, a fourth RFIC 928, a first radio frequency front end (RFFE) 932, a second RFFE 934, a first antenna module 942, a second antenna module 944, and an antenna 948. The electronic device 801 may further include the processor 820 and the memory 830. The second network 899 may include a first cellular network 992 and a second cellular network 994. According to another embodiment of the disclosure, the electronic device 801 may further include at least one component of the components illustrated in FIG. 8, and the second network 899 may further include at least another network. According to an embodiment of the disclosure, the first communication processor 912, the second communication processor 914, the first RFIC 922, the second RFIC 924, the fourth RFIC 928, the first RFFE 932, and the second RFFE 934 may form at least a part of the wireless communication module 892. According to another embodiment of the disclosure, the fourth RFIC 928 may be omitted or may be included as a part of the third RFIC 926.

The first communication processor 912 may establish a communication channel for a band to be used for wireless communication with the first cellular network 992 and may support legacy network communication through the established communication channel. According to various embodiments of the disclosure, the first cellular network 992 may be a legacy network including a 2nd generation (2G), $3^{rd}$ generation (3G), $4^{th}$ generation (4G), or long term evolution (LTE) network. The second communication processor 914 may support establishment of a communication channel corresponding to a specified band (e.g., about 6 GHz to about 60 GHz) among bands to be used for wireless communication with the second cellular network 994 and may support 5G network communication via the established communication channel According to various embodiments of the disclosure, the second cellular network 994 may be a 5G network defined in the 3GPP. Additionally, according to an embodiment of the disclosure, the first communication processor 912 or the second communication processor 914 may establish a communication channel for a specified band (e.g., about 6 GHz or lower) of the bands to be used for wireless communication with the second cellular network 994 and may support 5G network communication through the established communication channel According to an embodiment of the disclosure, the first communication processor 912 and the second communication processor 914 may be implemented in a single chip or a single package. According to various embodiments of the disclosure, the first communication processor 912 or the second communication processor 914 may be implemented in a single chip or a single package together with the processor 820, the auxiliary processor 823, or the communication module 890 of FIG. 8.

In the case of transmitting a signal, the first RFIC 922 may convert a baseband signal generated by the first communication processor 912 into a radio frequency (RF) signal of about 700 MHz to about 3 GHz that is used in the first cellular network 992. In the case of receiving a signal, an RF signal may be obtained from the first cellular network 992 (e.g., a legacy network) through an antenna (e.g., the first antenna module 942) and may be pre-processed through an RFFE (e.g., the first RFFE 932). The first RFIC 922 may convert the pre-processed RF signal into a baseband signal so as to be processed by the first communication processor 912.

In the case of transmitting a signal, the second RFIC 924 may convert a baseband signal generated by the first communication processor 912 or the second communication processor 914 into an RF signal (hereinafter referred to as a "5G Sub6 RF signal") in a Sub6 band (e.g., about 6 GHz or lower) used in the second cellular network 994 (e.g., a 5G network). In the case of receiving a signal, the 5G Sub6 RF signal may be obtained from the second cellular network 994 (e.g., a 5G network) through an antenna (e.g., the second antenna module 944) and may be preprocessed through an RFFE (e.g., the second RFFE 934). The second RFIC 924 may convert the pre-processed 5G Sub6 RF signal into a baseband signal so as to be processed by a corresponding communication processor of the first communication processor 912 or the second communication processor 914.

The third RFIC 926 may convert a baseband signal generated by the second communication processor 914 into an RF signal (hereinafter referred to as a "5G Above6 RF signal") in a 5G Above6 band (e.g., about 6 GHz to about 60 GHz) to be used in the second cellular network 994 (e.g., a 5G network). In the case of receiving a signal, the 5G Above6 RF signal may be obtained from the second cellular network 994 (e.g., a 5G network) through an antenna (e.g., the antenna 948) and may be pre-processed through a third RFFE 936. For example, the third RFFE 936 may perform pre-processing of a signal by using a phase shifter 938. The third RFIC 926 may convert the pre-processed 5G Above6 RF signal into a baseband signal so as to be processed by the second communication processor 914. According to an embodiment of the disclosure, the third RFFE 936 may be implemented as a part of the third RFIC 926.

According to an embodiment of the disclosure, the electronic device 801 may include the fourth RFIC 928 independently of the third RFIC 926 or as at least a part of the third RFIC 926. In this case, the fourth RFIC 928 may convert a baseband signal generated by the second communication processor 914 into an RF signal (hereinafter referred to as an "intermediate frequency (IF) signal") in an intermediate frequency band (e.g., ranging from about 9 GHz to about 11 GHz) and may provide the IF signal to the third RFIC 926. The third RFIC 926 may convert the IF signal into the 5G Above6 RF signal. In the case of receiving a signal, the 5G Above6 RF signal may be received from the second cellular network 994 (e.g., a 5G network) through an antenna (e.g., the antenna 948) and may be converted into an IF signal by the third RFIC 926. The fourth RFIC 928 may convert the IF signal into a baseband signal so as to be processed by the second communication processor 914.

According to an embodiment of the disclosure, the first RFIC 922 and the second RFIC 924 may be implemented with a part of a single package or a single chip. According to an embodiment of the disclosure, the first RFFE 932 and the second RFFE 934 may be implemented as a part of a single package or a single chip. According to an embodiment of the disclosure, at least one of the first antenna module 942 or the second antenna module 944 may be omitted or may be combined with any other antenna module to process RF signals in a plurality of bands.

According to an embodiment of the disclosure, the third RFIC 926 and the antenna 948 may be disposed at the same substrate to form a third antenna module 946. For example, the wireless communication module 892 or the processor 820 may be disposed on a first substrate (e.g., a main PCB). In this case, the third RFIC 926 may be disposed in a partial region (e.g., on a lower surface) of a second substrate (e.g., a sub PCB) independent of the first substrate, and the antenna 948 may be disposed in another partial region (e.g., on an upper surface) of the second substrate. As such, the third antenna module 946 may be formed. According to an embodiment of the disclosure, the antenna 948 may include, for example, an antenna array to be used for beamforming As the third RFIC 926 and the antenna 948 are disposed at the same substrate, it may be possible to decrease a length of a transmission line between the third RFIC 926 and the antenna 948. For example, the decrease in the transmission line may make it possible to prevent a signal in a high frequency band (e.g., about 6 GHz to about 60 GHz) used for the 5G network communication from being lost (or attenuated) due to the transmission line. As such, the electronic device 801 may improve the quality or speed of communication with the second cellular network 994 (e.g., a 5G network).

The second cellular network 994 (e.g., a 5G network) may be used independently of the first cellular network 992 (e.g., a legacy network) (e.g., this scheme being called "stand-alone (SA)") or may be used in a state of being connected with the first cellular network 992 (e.g., this scheme being called "non-stand alone (NSA)"). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 801 may access the access network of the 5G network and may then access an external network (e.g., Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 830 and may be accessed by another component (e.g., the processor 820, the first communication processor 912, or the second communication processor 914).

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment of the disclosure, the "module" may include an application-specific integrated circuit (ASIC).

Various embodiments of the disclosure may be implemented by software (e.g., the program 840) including an instruction stored in a machine-readable storage medium (e.g., an internal memory 836 or an external memory 838) readable by a machine (e.g., the electronic device 801). For example, the processor (e.g., the processor 820) of a machine (e.g., the electronic device 801) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment of the disclosure, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium, such as a memory of a manufacturer's server, an application store's server, or a relay server.

According to various embodiments of the disclosure, each component (e.g., the module or the program) of the above-described components may include one or plural entities. According to various embodiments of the disclosure, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments of the disclosure, operations performed by a module, a programming, or other components may be executed sequentially, in parallel, repeatedly, or in a heuristic method, or at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing in which at least a portion of an external device performing communication in a frequency band of 20 GHz or more is mounted;
   a support member connected with one region of the housing to allow a user to wear the electronic device on one region of a head of the user, and including a first support member surrounding at least a portion of a horizontal circumference of the user's head and a second support member surrounding at least a portion of a vertical circumference of the user's head; and
   an antenna module disposed in one region of the second support member,
   wherein the antenna module includes:
      an antenna layer including a plurality of patch antenna elements;
      a wireless circuit layer stacked under the antenna layer; and
      a heat radiating layer stacked under the wireless circuit layer, wherein the antenna layer, the wireless circuit layer, and the heat radiating layer are stacked so that peripheral edges of each side of the antenna layer, the wireless circuit layer and the heat radiating layer are substantially aligned on a vertical plane.

2. The electronic device of claim 1, wherein the electronic device includes a head mounted display device.

3. The electronic device of claim 1,
wherein the housing includes at least one fastening member supporting mounting of the external device, and
wherein the at least one fastening member includes a connector supporting a data transfer between the electronic device and the external device.

4. The electronic device of claim 3, further comprising:
a conductive member configured to electrically connect the antenna module and the external device,
wherein the conductive member includes one end electrically connected with the antenna module within the second support member, and an opposite end electrically connected with the connector of the at least one fastening member within the housing.

5. The electronic device of claim 4, wherein the antenna module is configured to:
convert a signal in a first frequency band received from the outside into a signal in a second frequency band lower than the first frequency band so as to be transferred to the external device through the conductive member, and
convert a signal in the second frequency band received from the external device through the conductive member into a signal in the first frequency band so as to be transmitted to the outside.

6. The electronic device of claim 1,
wherein the external device includes at least one antenna module, and
wherein the antenna module is disposed in an inner partial region of the second support member, at which a beam coverage of the at least one antenna module of the external device does not arrive.

7. The electronic device of claim 1, further comprising:
an absorption layer stacked under the heat radiating layer,
wherein the antenna layer, the wireless circuit layer, the heat radiating layer, and the absorption layer include the same area and shape, and
wherein edge regions of the antenna layer, the wireless circuit layer, the heat radiating layer, and the absorption layer are aligned side by side when stacked.

8. The electronic device of claim 7, wherein at least a portion of the absorption layer includes at least one of iron (Fe), cobalt (Co), or nickel (Ni).

9. The electronic device of claim 7, wherein at least a portion of the absorption layer includes at least one of iron (Fe), cobalt (Co) and nickel (Ni).

10. The electronic device of claim 1, wherein the antenna layer further includes:
a plurality of dipole antenna elements in an inner edge region of the antenna layer.

11. The electronic device of claim 10, wherein the plurality of dipole antenna elements include:
at least one of a first dipole antenna element group disposed along a first edge region of the antenna layer so as to cover a first direction;
a second dipole antenna element group disposed along a second edge region of the antenna layer so as to cover a second direction; and
a third dipole antenna element group disposed along a third edge region of the antenna layer so as to cover a third direction.

12. The electronic device of claim 11, wherein each of the first dipole antenna element group, the second dipole antenna element group, and the third dipole antenna element group includes the same number of dipole antenna elements.

13. The electronic device of claim 10, wherein the wireless circuit layer includes a transmit terminal for transmitting a signal in a specified frequency band through the antenna module and a receive terminal for receiving a signal in the specified frequency band through the antenna module.

14. The electronic device of claim 13, wherein the wireless circuit layer includes a first switch group for selectively connecting at least some of the plurality of patch antenna elements with the transmit terminal or the receive terminal, and a second switch group for selectively connecting at least some of the plurality of dipole antenna elements with the transmit terminal or the receive terminal.

15. The electronic device of claim 1, wherein at least a portion of the heat radiating layer includes at least one of copper (Cu), aluminum (Al), silicon carbide (SiC), or aluminum nitride (AlN).

16. The electronic device of claim 1, wherein at least a portion of the heat radiating layer includes at least one of copper (Cu), aluminum (Al), silicon carbide (SiC), and aluminum nitride (AlN).

17. The electronic device of claim 1, further comprising:
a flexible printed circuit board including a plurality of dipole antenna elements in an inner partial region and disposed such that one end of the flexible printed circuit board is electrically and physically connected with the wireless circuit layer and one surface of the flexible printed circuit board physically surrounds at least a portion of an edge region of the heat radiating layer.

18. The electronic device of claim 17, wherein the edge region of the heat radiating layer is curved with a specified curvature, and
wherein the printed circuit board is curved to correspond to a shape of the edge region of the heat radiating layer.

19. The electronic device of claim 17, wherein the plurality of dipole antenna elements include at least one of a first dipole antenna element group disposed to cover a first direction, a second dipole antenna element group disposed to cover a second direction, and a third dipole antenna element group disposed to cover a third direction, within the printed circuit board.

20. The electronic device of claim 1, wherein each of the antenna layer, the wireless circuit layer, and the heat radiating layer have substantially a same area and are each formed in a shape of a triangle.

* * * * *